(12) United States Patent
Bonin et al.

(10) Patent No.: US 7,057,856 B2
(45) Date of Patent: Jun. 6, 2006

(54) GIMBAL STRUT SHAPE TO INCREASE BUCKLING LOAD

(75) Inventors: Wayne Allen Bonin, North Oaks, MN (US); Zine-Eddine Boutaghou, Vandais Heights, MN (US); Adam Karl Himes, Richfield, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 312 days.

(21) Appl. No.: 10/702,336

(22) Filed: Nov. 6, 2003

(65) Prior Publication Data

US 2005/0099732 A1    May 12, 2005

(51) Int. Cl.
*G11B 5/48* (2006.01)
(52) U.S. Cl. .................................... 360/245.3
(58) Field of Classification Search ...................... None
See application file for complete search history.

(56) References Cited

U.S. PATENT DOCUMENTS

| | | | |
|---|---|---|---|
| 4,332,365 A | 6/1982 | Berk | 248/544 |
| 4,996,623 A | 2/1991 | Erpelding | 360/104 |
| 5,014,144 A * | 5/1991 | Sato et al. | 360/245.3 |
| 5,602,699 A | 2/1997 | Khan | 360/104 |
| 5,896,247 A | 4/1999 | Pan et al. | 360/104 |
| 5,973,884 A | 10/1999 | Hagen | 360/104 |
| 6,147,840 A | 11/2000 | Khan | 360/245.9 |
| 6,163,438 A * | 12/2000 | Kajitani | 360/245.7 |
| 6,288,875 B1 * | 9/2001 | Budde | 360/245.3 |
| 6,373,662 B1 | 4/2002 | Blaeser et al. | 360/245.5 |
| 6,377,425 B1 | 4/2002 | Khan | 360/245.9 |
| 6,397,455 B1 | 6/2002 | Hagen | 29/603.3 |
| 6,442,002 B1 | 8/2002 | Pan | 360/266.1 |
| 6,493,192 B1 | 12/2002 | Crane et al. | 360/294.3 |
| 6,560,073 B1 | 5/2003 | Ohwe et al. | 360/245.6 |
| 6,735,051 B1 * | 5/2004 | Zeng et al. | 360/245.7 |

* cited by examiner

*Primary Examiner*—Robert S. Tupper
(74) *Attorney, Agent, or Firm*—Todd R. Fronek; Westman, Champlin & Kelly

(57) ABSTRACT

The present invention includes gimbal having an attachment portion and a head support structure spaced apart from the attachment portion. A first strut connects the attachment portion and the head support structure. The first strut has an increased center portion and two end portions on opposite sides of the center portion. The increased center portion has a greater thickness than the two end portions. The gimbal also includes a second strut spaced apart from the first strut and is connected to the attachment portion and the head support structure. The second strut has an increased center portion and two end portions on opposite sides of the increased center portion. The increased center portion of the second strut has a greater thickness than the two end portions.

28 Claims, 5 Drawing Sheets

GIMBAL STRUT SHAPE TO INCREASE BUCKLING LOAD

FIELD OF THE INVENTION

The present invention relates generally to suspensions for data storage systems, and particularly but not by limitation to gimbals within data storage systems.

BACKGROUND OF THE INVENTION

In data processing systems, disc drives are often used as storage devices. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each slider assembly. The suspension includes a load beam and a gimbal. The load beam provides a load force that forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to lift and fly above or in close proximity to the disc surface.

Gimbals which support the head slider must allow the slider to rotate in pitch and yaw so as to conform to the plane of the disc while minimizing the torque applied to the slider, in order for the slider to fly properly over the disc. Gimbals must also be stiff in plane, to minimize undesired sideways motion that causes positioning error, and resist damage from stiction events where a significant force is required to free the head from the disc at start up. In the normal direction of disc rotation the gimbal struts are in tension, so buckling is not an issue, but under certain conditions a significant reverse rotation of the disc can occur, which can cause the gimbal struts to buckle. The gimbal buckling can then force the load beam up, which increases the preload force, preventing the slider from breaking free of the stiction, so that the gimbal is severely deformed and the drive is destroyed. One way of increasing the gimbal strut resistance to buckling is to increase the thickness or width, or decrease the length, but these all increase the stiffness in the desired gimbaling modes as well, which degrades the normal operation of the gimbal.

Embodiments of the present invention address these and/or other problems, and offer advantages over the prior art.

SUMMARY OF THE INVENTION

The present invention relates to a gimbal having an attachment portion and a head support structure spaced apart from the attachment portion. A first strut connects the attachment portion and the head support structure and includes an increased center portion and two end portions on opposite sides of the center portion. The increased center portion of the first strut has a greater thickness than the two end portions. The gimbal also includes a second strut spaced apart from the first strut and connected to the attachment portion and the head support structure. The second strut further includes an increased center portion and two end portions on opposite sides of the center portion. The increased center portion of the second strut has a greater thickness than the two end portions.

Another aspect of the present invention relates to a gimbal having an attachment portion and a head support structure. The gimbal also includes a pair of struts connecting the attachment portion and the head support structure. Each of the pair of struts includes a center portion and two end portions. The center portion has a greater stiffness than the two end portions. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
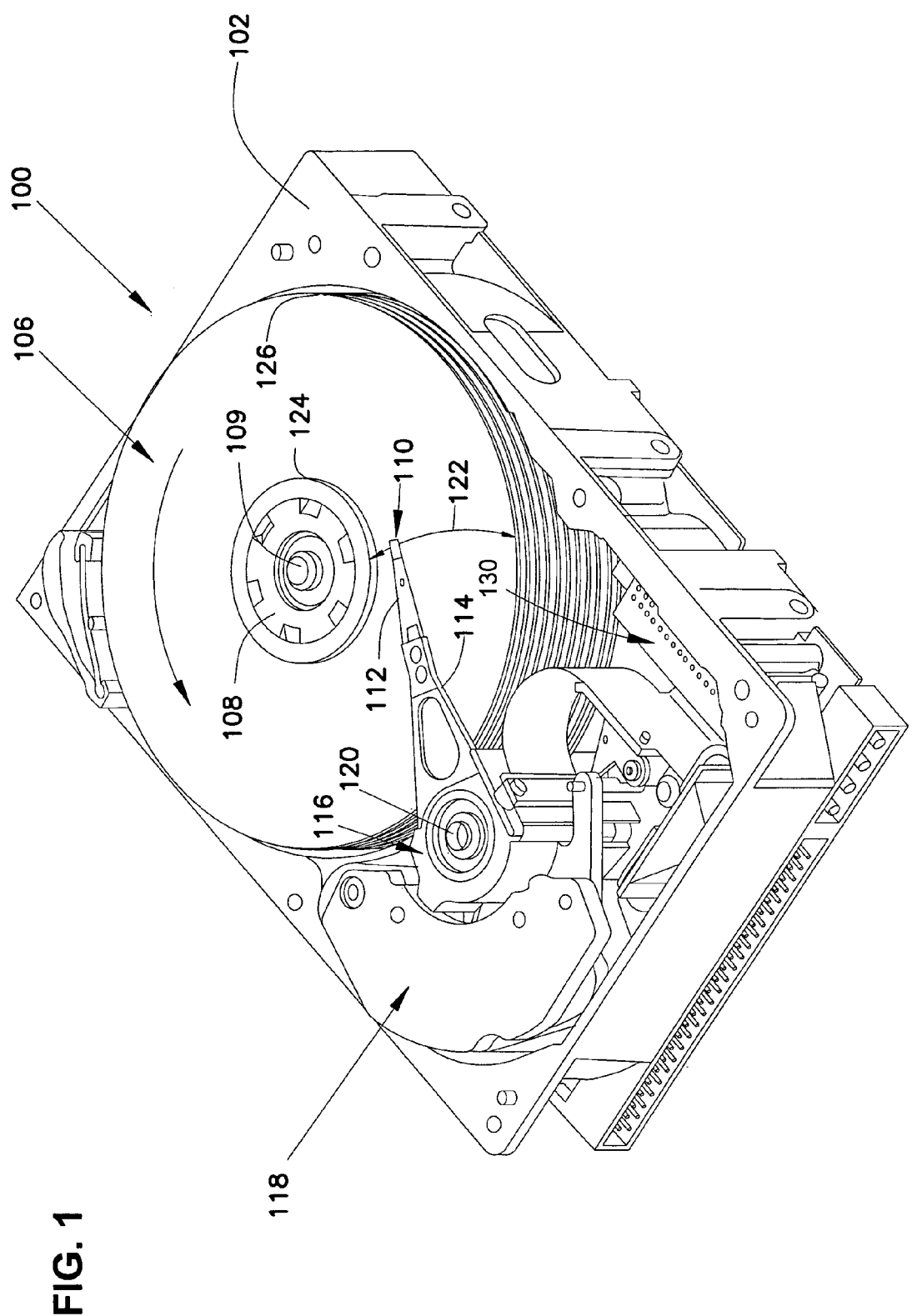
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface. The read/write head can include any type of transducing head, such as an inductive head, a magneto-resistive head, an optical head or a magneto-optical head for example.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 is driven by servo electronics 130 based on signals generated by sliders 110 and a host computer (not shown). Other types of actuators can also be used, such as linear actuators.

Figure 2:
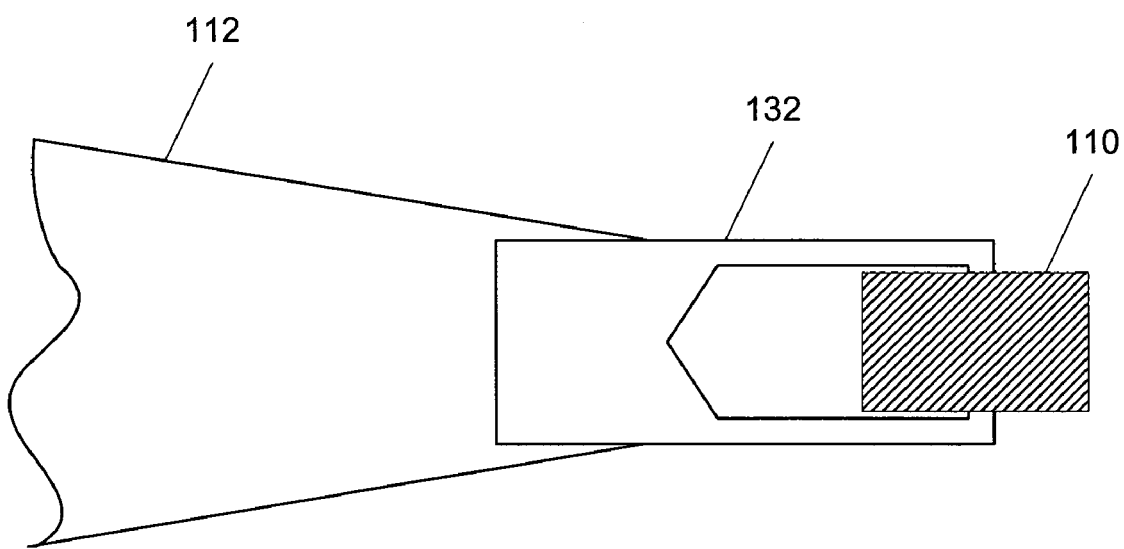
FIG. 2 is a schematic bottom view of a suspension assembly.

FIG. 2 illustrates a bottom schematic view of a distal end of suspension 112. Gimbal 132 is attached to suspension 112 and supports slider 110 above the surface of a disc. Gimbal 132 allows slider 110 to rotate in pitch and yaw directions in order to conform to the surface of a disc. In accordance with an embodiment of the present invention, struts on gimbal 132 have a central portion of increased thickness (in the width or depth direction) in order to prevent buckling and subsequent drive failures caused by the buckling of struts on gimbal 132.

During normal operation of the gimbal 132, the majority of the bending in the struts occurs near the ends, with very little bending occurring near the middle of the struts. During buckling, the struts bend significantly in the center as well as the ends. Increasing the stiffness of the center portion of the struts significantly increases the resistance to buckling, while only slightly increasing the stiffness of the desired gimbal motion. A reduction in strut width or thickness at the ends can be provided to keep the gimbal stiffness equal to that of a conventional strut design, with a significant increase in resistance to buckling.

Figure 3:
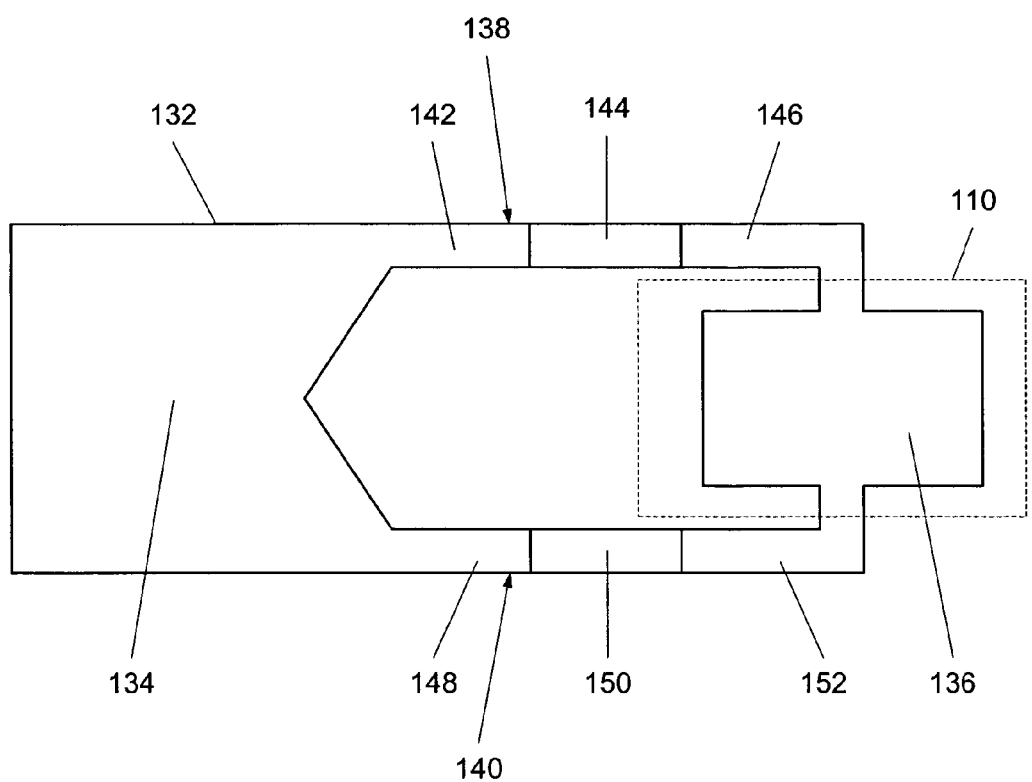
FIG. 3 is a top schematic view of a gimbal according an embodiment of the present invention.

FIG. 3 illustrates gimbal 132 according to an embodiment of the present invention. In one embodiment, gimbal 132 can be formed of a gimbal structure comprised of a single piece of material, although other embodiments including laminates can be used, for example. Gimbal 132 includes a suspension attachment portion 134 and a head support structure 136 spaced apart from the attachment portion 134. A first strut 138 and a second strut 140 connect the attachment portion 134 and head support structure 136. In the embodiment illustrated, strut 138 includes a first end portion 142 connected to attachment portion 134, a center portion 144 and a second end portion 146 connected to head support structure 136. Likewise, strut 140 includes a first end portion 148 connected to attachment portion 134, a center portion 150 and a second end portion 152 connected to head support structure 136. In order to reduce the likelihood of buckling, center portions 144 and 150 have a larger thickness and/or stiffness than end portions 142, 146, 148 and 152.

There are several different configurations and methods of forming a gimbal having a strut with a center portion for reducing the likelihood of buckling, including increasing the stiffness of the center portion, the depth of the center portion and/or the width of the center portion. For purposes of this description, depth of the center portion refers to the thickness of the center portion in a direction into and out of the page in FIG; 3 and width refers to the thickness in a direction orthogonal to the depth, and also orthogonal to the length dimension from one end portion to the other end portion. Many different thickness configurations may be used including a center portion having at least a 25% greater thickness than the end portions. Even a greater thickness of the center portion may be used, such as a thickness at least twice the thickness of the end portions.

Figure 4:
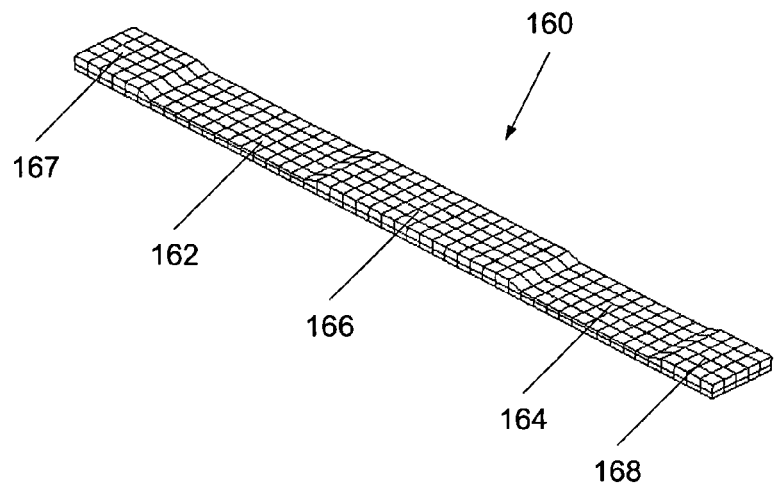
FIGS. 4–6 are perspective views of exemplary gimbal struts according to embodiments of the present invention.
Figure 5:
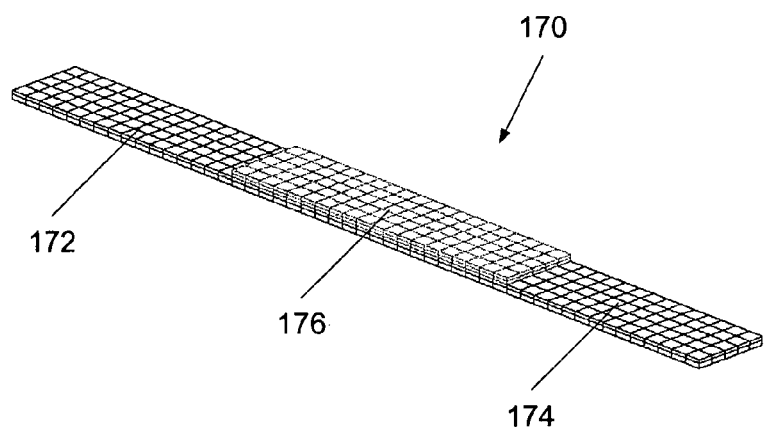
Figure 6:
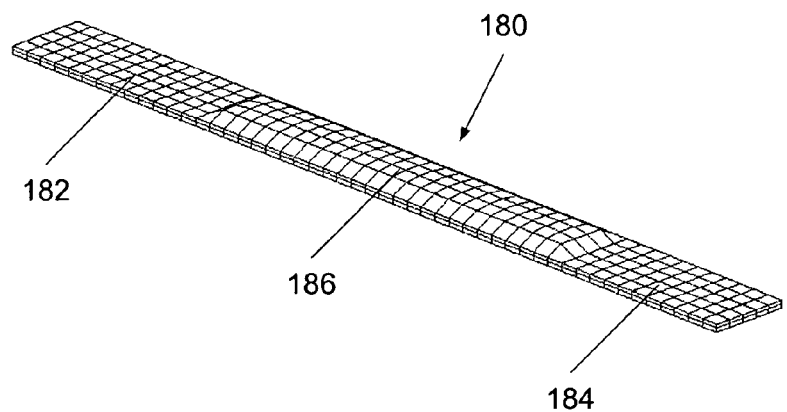

FIGS. 4–6 illustrate various embodiments of gimbal 132 with a center portion of increased depth. FIG. 4 illustrates a strut 160 that has been formed using an etching process. During the etching process, portions 162 and 164 are etched to a reduced thickness, leaving center portion 166 of a greater thickness than portions 162 and 164. In one embodiment, center portion 166 has a thickness of about 1.3 mils and portions 162 and 164 have a thickness of about 0.9 mils. Other thicknesses may also be used. Strut 160, if desired may also include end support portions 167 and 168 of increased thickness compared to portions 162 and 164. In another embodiment, material may be added to center portion 166 to increase the thickness thereof.

FIG. 5 illustrates strut 170 formed of a laminate, wherein portion 176 has been made thicker than end portions 172, 174. In one exemplary embodiment, the laminate includes a layer of steel that is about 0.9 mils thick, a layer of polyimide that is about 0.4 mils thick and a layer of copper that is about 0.4 mils thick. Center portion 176 includes the layer of steel, the layer of polyimide and the layer of copper while end portions 172 and 174 can have portions of all layers or only one or two layers and/or portions thereof. In FIG. 6, strut 180 has been formed to create center portion 186 of a greater thickness than end portions 182 and 184. In one embodiment, center portion 186 is formed to have a thickness of about 1.2 mils and a length of about 48 mils, and portions 182 and 184 have a thickness of about 0.9 mils and a length of about 17 mils.

Figure 7:
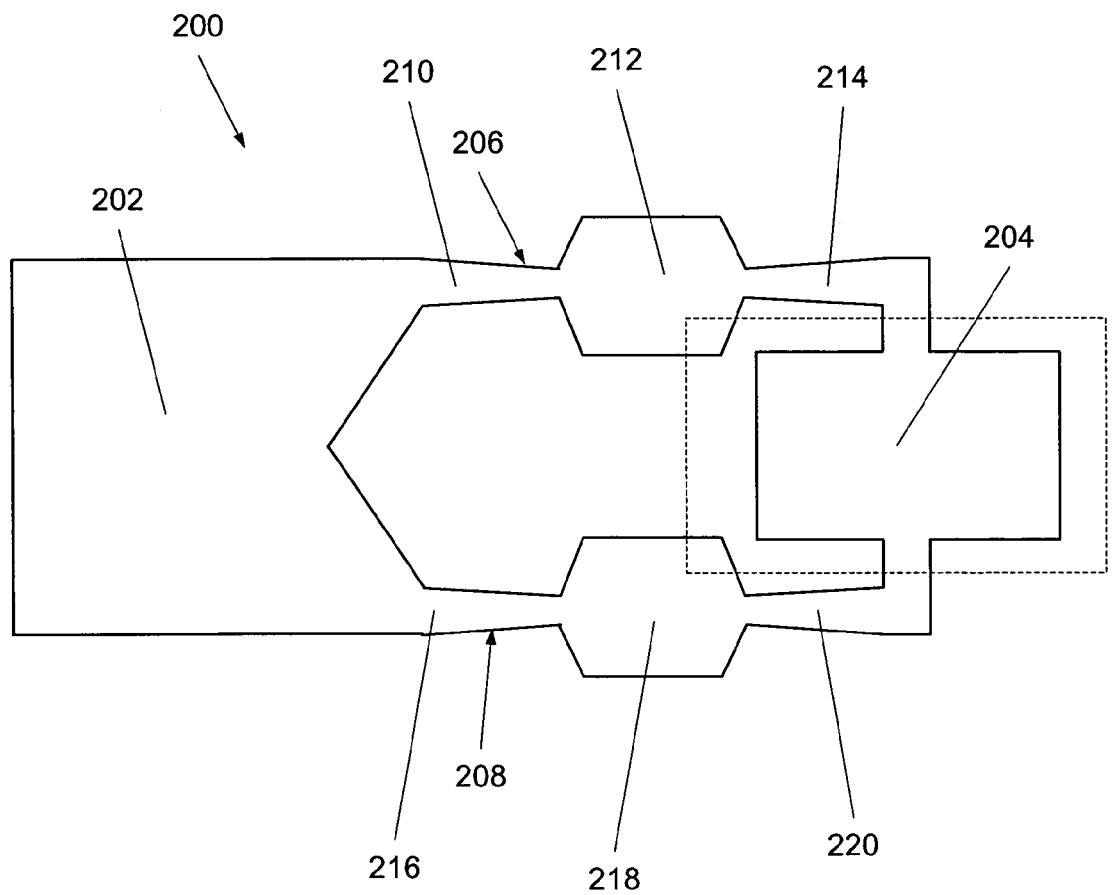
FIG. 7 is a schematic view of an alternative embodiment of a gimbal according to the present invention.

Gimbal struts according to the present invention may also have a center portion having an increased width to prevent buckling. FIG. 7 illustrates gimbal 200, which illustrates an alternative embodiment of the present invention. Gimbal 200 includes a suspension attachment portion 202 and a head support structure 204. Struts 206 and 208 connect the suspension attachment portion 202 and the head support structure 204. Strut 206 includes an end portion 210 connected to attachment portion 202, a center portion 212 and an end portion 214 connected to head support structure 204. Similarly, strut 208 includes an end portion 216 connected to attachment portion 202, a center portion 218 and a second end portion 220 connected to head support structure 204. As illustrated, center portions 212 and 218 are wider than end portions 210, 214, 216 and 220. The increased width of portions 212 and 218 aids in increasing the resistance to buckling of gimbal 200. In one embodiment, end portions 210, 214, 216 and 220 are of similar structure and taper from about 5 mils to about 3 mils in width. Additionally, center portions 212 and 218 are about 15 mils wide. Those skilled in the art will appreciate that different widths and/or tapering combinations may be used in accordance with the present invention. For example, center portions 212 and 218 may have a thickness at least 25% greater than the end portions 210, 214, 216 and 220. In another embodiment, center portions 212 and 218 have a thickness twice as large as end portions 210, 214, 216 and 220.

In summary, the present invention relates to a gimbal (132, 200) having an attachment portion (134, 202) and a head support structure (136, 204) spaced apart from the attachment portion (134, 202). A first strut (138, 140, 160, 170, 180, 206, 208) connects the attachment portion (134, 202) and the head support structure (134, 202) and includes an increased center portion (144, 150, 166, 176, 186, 212, 218) and two end portions (142, 146, 148, 152, 162, 164, 172, 174, 182, 184, 210, 214, 216, 220) on opposite sides of the center portion (144, 150, 166, 176, 186, 212, 218). The increased center portion (144, 150, 166, 176, 186, 212, 218) of the first strut (138, 140, 160, 170, 180, 206, 208) has a greater thickness or width than the two end portions (142, 146, 148, 152, 162, 164, 172, 174, 182, 184, 210, 214, 216, 220). The gimbal (132, 200) also includes a second strut (138, 140, 160, 170, 180, 206, 208) spaced apart from the first strut (138, 140, 160, 170, 180, 206, 208) and connected to the attachment portion (134, 202) and the head support structure (136, 204). The second strut (138, 140, 160, 170, 180, 206, 208) further includes an increased center portion (144, 150, 166, 176, 186, 212, 218) and two end portions (142, 146, 148, 152, 162, 164, 172, 174, 182, 184, 210, 214, 216, 220) on opposite sides of the center portion (144, 150, 166, 176, 186, 212, 218). The increased center portion (144, 150, 166, 176, 186, 212, 218) of the second strut (138, 140, 160, 170, 180, 206, 208) has a greater thickness than the two end portions (142, 146, 148, 152, 162, 164, 172, 174, 182, 184, 210, 214, 216, 220).

Another aspect of the present invention relates to a gimbal (132, 200). The gimbal includes an attachment portion (134, 202) and a head support structure (136, 204). The gimbal also includes a pair of struts (138, 140, 160, 170, 180, 206, 208) connecting the attachment portion (134, 202) and the head support structure (136, 204). Each of the pair of struts (138, 140, 160, 170, 180, 206, 208) includes a center portion (144, 150, 166, 176, 186, 212, 218) and two end portions (142, 146, 148, 152, 162, 164, 172, 174, 182, 184, 210, 214, 216, 220). The center portion (144, 150, 166, 176, 186, 212, 218) has a greater stiffness than the two end portions (142, 146, 148, 152, 162, 164, 172, 174, 182, 184, 210, 214, 216, 220).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the suspension assembly while maintaining substantially the same functionality without departing from the scope and spirit of the present invention. In addition, although the preferred embodiment described herein is directed to a gimbal of a suspension assembly for a data storage system, it will be appreciated by those skilled in the art that the teachings of the present invention can be applied to other assemblies, without departing from the scope and spirit of the present invention.

What is claimed is:

1. A gimbal, comprising:
   an attachment portion adapted to be connected to a suspension;
   a bead support structure spaced apart from the attachment portion and adapted to support a head;
   a first strut connected to the attachment portion and the head support structure, the first strut having an increased center portion and two end portions on opposite sides of the center portion, the center portion having a greater thickness than the two end portions; and
   a second strut spaced apart from the first strut and connected to the attachment portion and the head support structure and having an increased center portion and two end portions on opposite sides of the center portion, the center portion having a greater thickness than the two end portions.

2. The gimbal of claim 1 wherein the first strut further includes:
   a first end support portion and a second end support portion positioned proximate the attachment portion and the head support structure, respectively, and wherein the first end support portion and the second end support portion have a greater thickness than the two end portions; and wherein the second strut further includes:
   a first end support portion and a second end support portion positioned proximate the attachment portion and the head support structure, respectively, and wherein the first end support portion and the second end support portion have a greater thickness than the two end portions.

3. The gimbal of claim 1 wherein the two end portions of the first strut include a layer of steel and the increased center portion of the first strut includes a layer of steel, a layer of copper and a layer of polyimide and wherein the two end portions of the second strut include a layer of steel and the increased center portion of the second strut includes a layer of steel, a layer copper and a layer of polyimide.

4. The gimbal of claim 1 wherein the center portion of the first strut and the center portion of the second strut both have a length of about 3 times the length of each end portion.

5. The gimbal of claim 1 wherein the increased center portion of the first strut and the increased center portion of the second strut have a thickness at least 25% greater than the thickness of the two end portions.

6. The gimbal of claim 1 wherein the increased center portion of the first strut has a greater depth than the two end portions of the first strut and wherein the increased center portion of the second strut has a greater depth than the two end portions of the second strut.

7. The gimbal of claim 1 wherein the increased center portion of the first strut has a greater width than the two end portions of the first strut and the increased center portion of the second strut has a greater width than the two end portions of the second strut.

8. The gimbal of claim 7 wherein the center portion of the first strut and the center portion of the second strut have a width of at least twice the width of the end portions.

9. The gimbal of claim 1 wherein the increased center portion of the first strut has a greater stiffness than the two end portions of the first strut and the increased center portion of the second strut has a greater stiffness than the two end portions of the second strut.

10. A suspension assembly comprising:
    the gimbal of claim 1;
    a suspension attached to the attachment portion of the gimbal; and
    a head attached to the head support structure and supported by the gimbal.

11. A data storage system comprising:
    the suspension assembly of claim 10; and
    a storage medium, wherein the suspension assembly supports the head above the storage medium.

12. A gimbal comprising:
    an attachment portion adapted to be connected to a suspension;
    a head support structure spaced apart from the attachment portion and adapted to support a head; and
    a pair of struts connecting the attachment portion and the head support structure, the pair of struts including means for increasing resistance to buckling.

13. The gimbal of claim 12 wherein the means for increasing resistance to buckling includes, for each of the pair of struts, a center portion and two end portions, the center portion having a greater stiffness than the two end portions.

14. The gimbal of claim 12 wherein the means for increasing resistance to buckling includes, for each of the pair of struts, an increased center portion and two end portions, the increased center portion having a greater thickness than the two end portions.

15. The gimbal of claim 14 wherein each of the pair of struts further include a first end support portion and a second end support portion positioned proximate the attachment portion and the head support structure, respectively, and wherein the first end support portion and the second end support portion have a greater thickness than the two end portions.

16. The gimbal of claim 12 wherein the means for increasing resistance to buckling include a layer of steel, a layer of copper and a layer of a polyimide.

17. The gimbal of claim 14 wherein, for each of the pair of struts, the increased center portion has a greater depth than the two end portions.

18. The gimbal of claim 14 wherein, for each of the pair of struts, the increased center portion has a greater width than the two end portions.

19. The gimbal of claim 18 wherein the increased center portion of the first strut and the increased center portion of the second strut have a width of at least two times the width of the respective end portions of the struts.

20. The gimbal of claim 19 wherein the increased center portion of the first strut and the increased center portion of the second strut have a length of about three times the length of the respective end portions of the struts.

21. A gimbal comprising:
an attachment portion;
a head support structure; and
a pair of struts that connect the attachment portion and the head support structure, wherein each of the pair of struts includes a center portion and two end portions, the center portion having a greater stiffness than the two end portions.

22. The gimbal of claim 21 wherein each of the pair of struts further include:
a first end support portion and a second end support portion positioned proximate the attachment portion and the head support structure, respectively, and wherein the first end support portion and the second end support portion have a greater thickness than the two end portions.

23. The gimbal of claim 21 wherein the two end portions of each of the pair of struts include a layer of steel and the center portion of each of the pair of struts includes a layer of steel, a layer of copper and a layer of polyimide.

24. The gimbal of claim 21 wherein the center portion of each of the pair of struts have a length of about 3 times the length of each respective end portion.

25. The gimbal of claim 21 wherein the center portion of each of the pair of struts have a thickness at least 25% greater than the thickness of each respective end portion.

26. The gimbal of claim 21 wherein the center portion of each of the pair of struts has a greater depth than each respective end portion.

27. The gimbal of claim 21 wherein the center portion of each of the pair of struts has a greater width than each respective end portion.

28. The gimbal of claim 27 wherein the center portion of each of the pair of struts have a width of at least twice the width of each respective end portion.

* * * * *

UNITED STATES PATENT AND TRADEMARK OFFICE
CERTIFICATE OF CORRECTION

PATENT NO. : 7,057,856 B2 Page 1 of 1
APPLICATION NO. : 10/702336
DATED : June 6, 2006
INVENTOR(S) : Wayne Allen Bonin et al.

It is certified that error appears in the above-identified patent and that said Letters Patent is hereby corrected as shown below:

Col. 5, Line 39, replace "bead" with --head--.

Col. 6, Line 7, replace "layer copper" with --layer of copper--.

Signed and Sealed this

Twenty-seventh Day of November, 2007

JON W. DUDAS
*Director of the United States Patent and Trademark Office*